(12) United States Patent
Wang et al.

(10) Patent No.: US 11,436,528 B2
(45) Date of Patent: Sep. 6, 2022

(54) INTENT CLASSIFICATION DISTRIBUTION CALIBRATION

(71) Applicant: International Business Machines Corporation, Armonk, NY (US)

(72) Inventors: Haoyu Wang, Somerville, MA (US); Ming Tan, Malden, MA (US); Dakuo Wang, Cambridge, MA (US); Chuang Gan, Cambridge, MA (US); Saloni Potdar, Arlington, MA (US)

(73) Assignee: International Business Machines Corporation, Armonk, NY (US)

( * ) Notice: Subject to any disclaimer, the term of this patent is extended or adjusted under 35 U.S.C. 154(b) by 528 days.

(21) Appl. No.: 16/543,117

(22) Filed: Aug. 16, 2019

(65) Prior Publication Data

US 2021/0049502 A1 Feb. 18, 2021

(51) Int. Cl.
*G06N 20/00* (2019.01)
*G06N 7/00* (2006.01)
*G06F 16/28* (2019.01)

(52) U.S. Cl.
CPC .......... *G06N 20/00* (2019.01); *G06F 16/285* (2019.01); *G06N 7/005* (2013.01)

(58) Field of Classification Search
CPC ........ G06N 20/00; G06N 20/10; G06N 20/20; G06N 7/00; G06N 7/005; G06N 5/00; G06N 5/02; G06N 5/04; G06N 5/022
See application file for complete search history.

(56) References Cited

U.S. PATENT DOCUMENTS

| 2016/0235324 A1 | 8/2016 | Mershin et al. |
| 2017/0295114 A1 | 10/2017 | Goldberg et al. |
| 2018/0012139 A1 | 1/2018 | Schmid et al. |

FOREIGN PATENT DOCUMENTS

| CN | 109063221 A | 12/2018 |
| WO | 2015/044934 A1 | 4/2015 |
| WO | 2019/113122 A1 | 6/2019 |

OTHER PUBLICATIONS

Sugiyama et al. "Direct Importance Estimation with Model Selection and Its Application to Covariate Shift Adaptation", 2007 https://proceedings.neurips.cc/paper/2007/hash/be83ab3ecd0db773eb2dc1b0a17836a1-Abstract.html (Year: 2007).*

(Continued)

*Primary Examiner* — Kamran Afshar
*Assistant Examiner* — Shoun J Abraham
(74) *Attorney, Agent, or Firm* — Christopher M. Pignato; Nicholas L. Cadmus

(57) ABSTRACT

A method includes determining, based on an input data sample, a set of probabilities. Each probability of the set of probabilities is associated with a respective label of a set of labels. A particular probability associated with a particular label indicates an estimated likelihood that the input data sample is associated with the particular label. The method includes modifying the set of probabilities based on a set of adjustment factors to generate a modified set of probabilities. The set of adjustment factors is based on a first relative frequency distribution and a second relative frequency distribution. The first relative frequency distribution indicates for each label of the set of labels, a frequency of occurrence of the label among training data. The second relative frequency distribution indicates for each label of the set of labels, a frequency of occurrence of the label among post-training data provided to the trained classifier.

20 Claims, 12 Drawing Sheets

(56) References Cited

OTHER PUBLICATIONS

Cao et al. "Learning Imbalanced Datasets with Label-Distribution-Aware Margin Loss", Jun. 2019 https://arxiv.org/pdf/1906.07413v1.pdf (Year: 2019).*
Chen et al. "Generalisation and domain adaptation in GP with gradient descent for symbolic regression", 2015 https://ieeexplore.ieee.org/abstract/document/7257017 (Year: 2015).*
Bruzzone et al. "Domain Adaptation Problems: A DASVM Classification Technique and a Circular Validation Strategy", 2009 https://ieeexplore.ieee.org/abstract/document/4803844 (Year: 2009).*
Tsuboi et al. "Direct Density Ratio Estimation for Large-scale Covariate Shift Adaptation", 2009 http://citeseerx.ist.psu.edu/viewdoc/download?doi=10.1.1.722.8836&rep=rep1&type=pdf (Year: 2009).*
Bella, Antonio, et al., "Calibration of Machine Learning Models", Handbook of Research on Machine Learning Applications and Trends: Algorithms, Methods, and Techniques. IGI Global, 2010, 128-146.
Liu, Tongliang, et al., "Classification with Noisy Labels by Importance Reweighting", IEEE Transactions on Pattern Analysis and Machine Intelligence, 2015.
Liu, Alexander, et al., "Generative Oversampling for Mining Imbalanced Datasets", DMIN, 2007.
Ren, Mengye, et al., "Learning to Reweight Examples for Robust Deep Learning", Proceedings of the 35th International Conference on Machine Learning, Stockholm, Sweden, 2018.
Tang, Yuchun, et al., "SVMs Modeling for Highly Imbalanced Classification", IEEE Transactions on Systems, Man, and Cybernetics—Part B: Cybernetics, vol. 39, No. 1, Feb. 1, 2019.
Zhu, Xiaojin, et al., "Learning from Labeled and Unlabeled Data with Label Propagation", Technical Report CMU-CALD-02-107, Carnegie Mellon University, Jun. 1, 2002.

* cited by examiner

| Testing Text | Probability of First Label | Probability of Second Label | Probability of Third Label | Probability of Fourth Label |
|---|---|---|---|---|
| I need a credit card application | 11% | 85% | 3% | 1% |
| How much is my monthly payment | 3% | 5% | 85% | 7% |
| Start a credit application | 12% | 78% | 5% | 5% |
| Misplaced my credit card | 15% | 3% | 7% | 75% |
| I want to pay my bill | 15% | 3% | 80% | 2% |
| Somebody stole my card | 20% | 2% | 3% | 75% |
| Partial payment | 15% | 3% | 79% | 3% |
| Do I qualify for a new card | 20% | 65% | 10% | 5% |
| Start the application process | 15% | 72% | 7% | 6% |
| Pay my bill | 5% | 3% | 90% | 2% |

Determine, by a trained classifier based on an input data sample, a set of probabilities, each probability of the set of probabilities associated with a respective label of a set of labels, a particular probability associated with a particular label indicating an estimated likelihood that the input data sample is associated with the particular label

704

Modify the set of probabilities based on a set of adjustment factors to generate a modified set of probabilities, the set of adjustment factors based on a first relative frequency distribution and a second relative frequency distribution, the first relative frequency distribution indicating for each label of the set of labels, a frequency of occurrence of the label among training data used to train the trained classifier, and the second relative frequency distribution indicating for each label of the set of labels, a frequency of occurrence of the label among post-training data provided to the trained classifier

FIG. 7

INTENT CLASSIFICATION DISTRIBUTION CALIBRATION

BACKGROUND

The present disclosure relates to intent classification, and more specifically, to calibrating intent classification label distribution.

SUMMARY

According to an embodiment of the present disclosure, a computer-implemented method of intent classification includes determining, by a trained classifier based on an input data sample, a set of probabilities. Each probability of the set of probabilities is associated with a respective label of a set of labels. A particular probability associated with a particular label indicates an estimated likelihood that the input data sample is associated with the particular label. The computer-implemented method also includes modifying the set of probabilities based on a set of adjustment factors to generate a modified set of probabilities. The set of adjustment factors is based on a first relative frequency distribution and a second relative frequency distribution. The first relative frequency distribution indicates for each label of the set of labels, a frequency of occurrence of the label among training data used to train the trained classifier. The second relative frequency distribution indicates for each label of the set of labels, a frequency of occurrence of the label among post-training data provided to the trained classifier.

According to another embodiment of the present disclosure, an apparatus includes a processor and a memory coupled to the processor. The memory stores instructions that, when executed by the processor, cause the processor to perform operations including determining, by a trained classifier based on an input data sample, a set of probabilities. Each probability of the set of probabilities is associated with a respective label of a set of labels. A particular probability associated with a particular label indicates an estimated likelihood that the input data sample is associated with the particular label. The operations also include modifying the set of probabilities based on a set of adjustment factors to generate a modified set of probabilities. The set of adjustment factors is based on a first relative frequency distribution and a second relative frequency distribution. The first relative frequency distribution indicates for each label of the set of labels, a frequency of occurrence of the label among training data used to train the trained classifier. The second relative frequency distribution indicates for each label of the set of labels, a frequency of occurrence of the label among post-training data provided to the trained classifier.

According to another embodiment of the present disclosure, a computer program product for intent classification includes a computer readable storage medium having program instructions embodied therewith. The program instructions are executable by a processor to cause the processor to perform operations including determining, by a trained classifier based on an input data sample, a set of probabilities. Each probability of the set of probabilities is associated with a respective label of a set of labels. A particular probability associated with a particular label indicates an estimated likelihood that the input data sample is associated with the particular label. The operations also include modifying the set of probabilities based on a set of adjustment factors to generate a modified set of probabilities. The set of adjustment factors is based on a first relative frequency distribution and a second relative frequency distribution. The first relative frequency distribution indicates for each label of the set of labels, a frequency of occurrence of the label among training data used to train the trained classifier. The second relative frequency distribution indicates for each label of the set of labels, a frequency of occurrence of the label among post-training data provided to the trained classifier.

BRIEF DESCRIPTION OF THE DRAWINGS

FIG. 5 illustrates an example of an intent classification chart that displays results of intent classifications based on the techniques described herein;

FIG. 7 is a flowchart of a method for intent classification;

DETAILED DESCRIPTION

Figure 1:
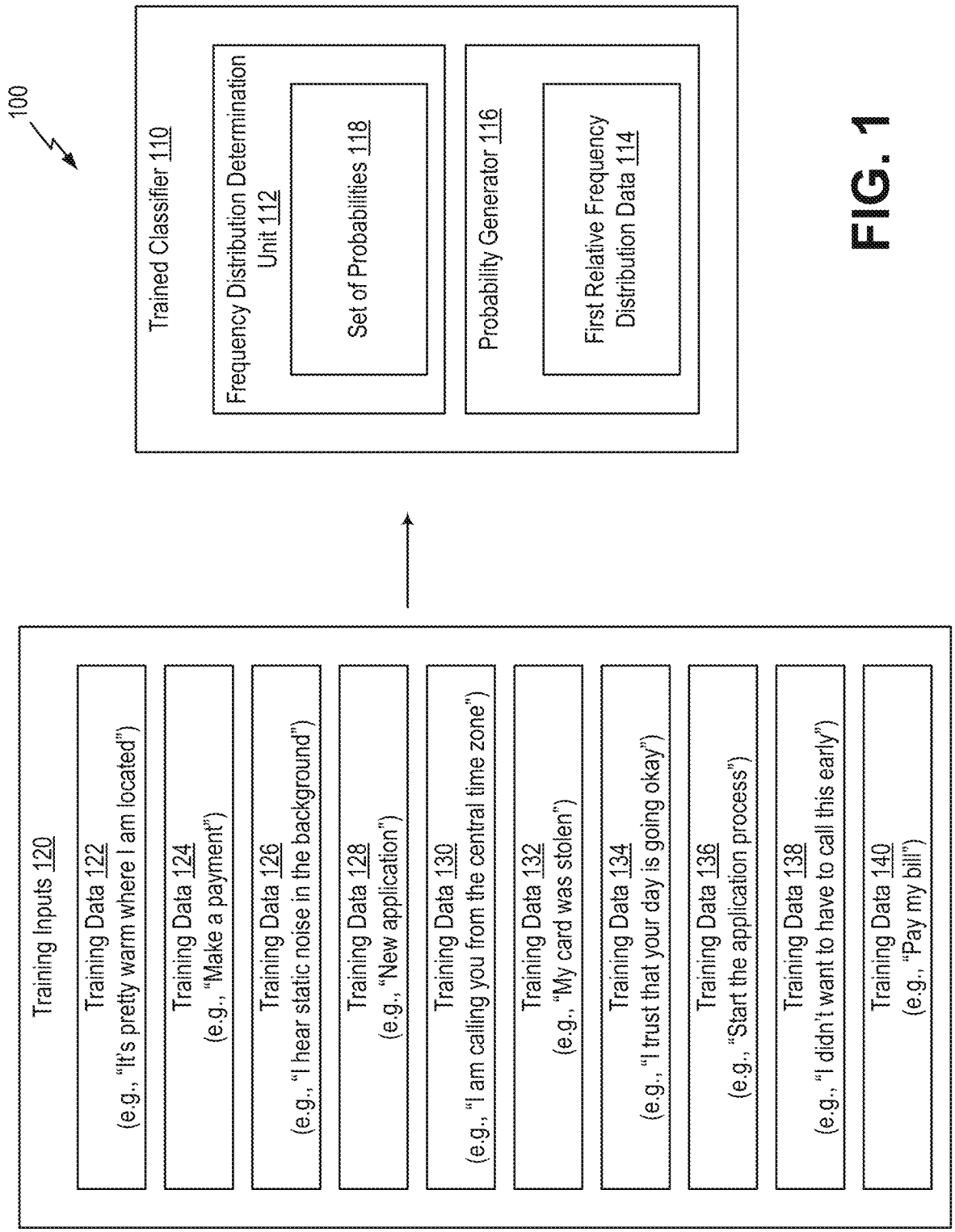
FIG. 1 is a block diagram of a system that is operable to generate an intent label distribution using training data.

Particular implementations are described with reference to the drawings. In the description, common features are designated by common reference numbers throughout the drawings. As used herein, various terminology is used for the purpose of describing particular implementations only and is not intended to be limiting. For example, the singular forms "a," "an," and "the" are intended to include the plural forms as well, unless the context clearly indicates otherwise. Further, the terms "comprise," "comprises," and "comprising" may be used interchangeably with "include," "includes," or "including." Additionally, it will be understood that the term "wherein" may be used interchangeably with "where." As used herein, "exemplary" may indicate an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

In the present disclosure, terms such as "determining", "calculating", "generating", "adjusting", "modifying", etc. may be used to describe how one or more operations are performed. It should be noted that such terms are not to be construed as limiting and other techniques may be utilized to perform similar operations. Additionally, as referred to herein, "generating", "calculating", "using", "selecting", "accessing", and "determining" may be used interchangeably. For example, "generating", "calculating", or "determining" a parameter (or a signal) may refer to actively generating, calculating, or determining the parameter (or the signal) or may refer to using, selecting, or accessing the parameter (or signal) that is already generated, such as by another component or device. Additionally, "adjusting" and "modifying" may be used interchangeably. For example, "adjusting" or "modifying" a parameter may refer to changing the parameter from a first value to a second value (a "modified value" or an "adjusted value"). As used herein, "coupled" may include "communicatively coupled," "electrically coupled," or "physically coupled," and may also (or alternatively) include any combinations thereof. Two devices (or components) may be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled may be included in the same device or in different devices and may be connected via electronics, one or more connectors, or inductive coupling, as illustrative, non-limiting examples. In some implementations, two devices (or components) that are communicatively coupled, such as in electrical communication, may send and receive electrical signals (digital signals or analog signals) directly or indirectly, such as via one or more wires, buses, networks, etc. As used herein, "directly coupled" may include two devices that are coupled (e.g., communicatively coupled, electrically coupled, or physically coupled) without intervening components.

An online machine learning system can be integrated into a chat-bot to classify different intents of input samples (e.g., phrases, words, etc.) For example, the chat-bot can receive a phrase from a user and classify the phrase into one or more different categories or labels. To illustrate, if the chat-bot is associated with a credit card company, the chat-bot can be integrated into a call-management system such that when a caller states a particular phrase (e.g., "Pay my bill"), the chat-bot is able to identify that the caller want to perform a function associated with a "Credit Card Payment" label. Because the chat-bot (e.g., an intent classifier) is trained to classify different input samples using training data, the reliability of the intent classification can be largely dependent on a distribution of different intents during training. For example, if a large percentage of the training data used to train the chat-bot is associated with the "Credit Card Payment" label, the chat-bot may incorrectly classify phrases from a caller if the phrase is not associated with a credit card payment. For example, the chat-bot can incorrectly classify the phrase "credit card form" as a phrase associated with the "Credit Card Payment" label, as opposed to a more appropriate label, such as a "Credit Card Application" label. Thus, reliability of the intent classifications can suffer from divergent distribution of training data and post-training data (e.g., real-world data).

The present disclosure describes an intent classification label distribution calibration method that is able to quickly adjust the model (used by the chat-bot) to a target distribution associated with post-training data (e.g., real-world data). For example, for a given intent classification model f (X) used by a voice application system (e.g., a chat-bot, a telephone directory system, etc.) and a target label distribution $P(y=i)|_{i=1}^{M}$, the intent classification label distribution calibration method readjusts the model's prediction so that the predication distribution on the post-training data $\{X_i^{test}\}_{i=1}^{N_{test}})$ follows the target label distribution.

One advantage provided by the systems, methods, and computer program products described herein is an ability to modify an intent classification model based on a distribution of labels that are associated with post-training data while bypassing the time consuming process of re-training the model. As a result, voice application systems (e.g., chat-bots, telephone directory systems, etc.) can be continuously updated based on real-world inputs to more accurately classify input samples (e.g., phrases, words, etc.) with appropriate labels.

With reference to FIG. 1, a system 100 that is operable to generate an intent label distribution using training data is shown. The system 100 includes a trained classifier 110. The trained classifier 110 includes a frequency determination unit 112 that is operable to generate first relative frequency distribution data 114 based on training inputs 120 that is provided to the trained classifier 110 during a training stage. As explained with greater detail with respect to FIG. 2, the first relative frequency distribution data 114 indicates a frequency of occurrence for different labels among the training inputs 120 used to train the trained classifier 110. The trained classifier 110 also includes a probability generator 116 that determines a set of probabilities 118 based on the first relative frequency distribution data 114. As explained with greater detail with respect to FIG. 2, each probability of the set of probabilities 118 is associated with a respective label. For example, a particular probability associated with a particular label indicates an estimated likelihood that an input data sample is associated with the particular label.

The training inputs 120 include different training data $X_i^{train}$ (e.g., samples, words, phrases, expressions, etc.). For example, the training inputs 120 include training data 122, training data 124, training data 126, training data 128, training data 130, training data 132, training data 134, training data 136, training data 138, and training data 140. The training data 122 includes the phrase "It's pretty warm where I am located", the training data 124 includes the phrase "Make a payment", the training data 126 includes the phrase "I hear static noise in the background", the training data 128 includes the phrase "New application", and the training data 130 includes the phrase "I am calling you from the central time zone." The training data 132 includes the phrase "My card was stolen", the training data 134 includes the phrase "I trust that your day is going okay", the training data 136 includes the phrase "Start the application process", the training data 138 includes the phrase "I didn't want to have to call this early," and the training data 140 includes the phrase "Pay my bill."

Figure 2:
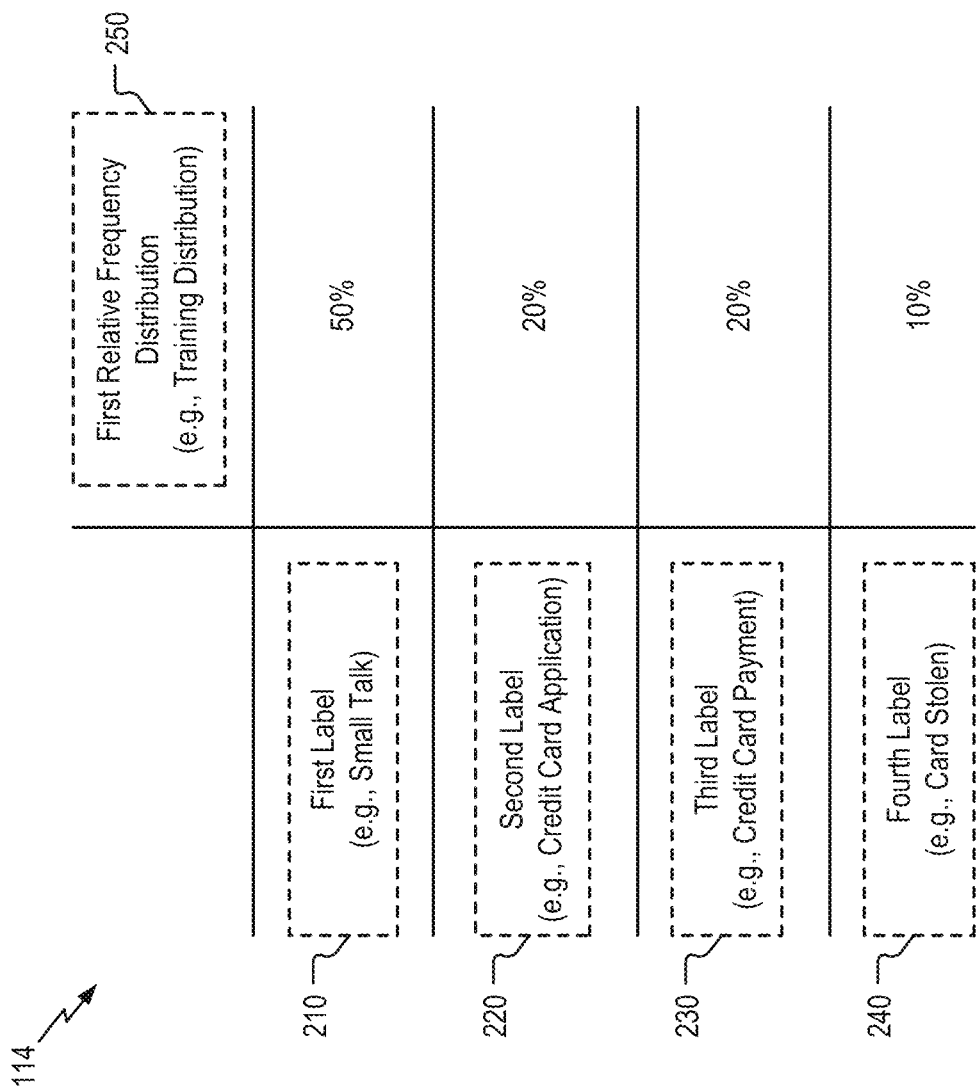
FIG. 2 illustrates an example of an intent label distribution according to the techniques and system of FIG. 1.

The trained classifier 110 can categorize the training data 122-140 into different categories or intent labels $y_i^{train}$, such that a classification training dataset is defined as $\{X_i^{train}, y_i^{train}\}_{i=1}^{N_{train}}$. There are M possible values for the intent label such that $y_i \in \{1, 2, \ldots, M\}$. As a non-limiting example, with reference to FIG. 2, during the training stage, the trained classifier 110 can categorize the training data 122-140 into a first label 210, a second label 220, a third label 230, or a fourth label 240. Thus, in the example of FIG. 2, M is equal to four (4). In the example of FIG. 2, the first label 210 is categorized as "small talk" or "chitchat", the second label 220 is categorized as "credit card application", the third label 230 is categorized as "credit card payment", and the fourth label 240 is categorized as "card stolen." Thus, according to the example of FIG. 2, the trained classifier 110 is configured to classify inputs into different categories associated with a credit card inquiry. It should be understood that, in other implementations, the trained classifier 110 can categorize inputs into categories associated with other inquiries or subjects. According to one implementation, after the training stage, the trained classifier 110 can go "live" and be used to direct users to different prompts based on phrases spoken by the users. As a non-limiting example, the trained classifier 110 can be used in conjunction with an automated voice system to direct users to different prompts.

The frequency distribution determination unit 112 can determine the first relative frequency distribution data 114 that indicates a first relative frequency distribution 250 (e.g., a training distribution) of the training data 122-140. The first relative frequency distribution 250 indicates, for each label 210-240, a frequency of occurrence of the label 210-240 among the training data 122-140 used to train the trained classifier 110. For example, referring to the first relative frequency distribution data 114 in FIG. 2, the first relative frequency distribution 250 of the first label 210 is fifty percent (50%). That is, fifty percent of the training data 122-140 is associated with the first label 210 (e.g., "small talk"). To illustrate, the training data 122, the training data 126, the training data 130, the training data 134, and the training data 138 are associated with the first label 210. The first relative frequency distribution 250 of the second label 220 is twenty percent (20%). That is, twenty percent of the training data 122-140 is associated with the second label 220 (e.g., "credit card application"). To illustrate, the training data 128 and the training data 136 are associated with the second label 220. The first relative frequency distribution 250 of the third label 230 is twenty percent (20%). That is, twenty percent of the training data 122-140 is associated with the third label 230 (e.g., "credit card payment"). To illustrate, the training data 124 and the training data 140 are associated with the third label 230. The first relative frequency distribution 250 of the fourth label 240 is ten percent (10%). That is, ten percent of the training data 122-140 is associated with the fourth label 240 (e.g., "card stolen"). To illustrate, the training data 132 is associated with the fourth label 240.

The probability generator 116 can determine the set of probabilities 118 based on the input data sample $x_i^{train}$ (e.g., the training inputs 120), the first relative frequency distribution data 114, and a model f (X) generated during the training stage. For example, each probability of the set of probabilities 118 is associated with a respective label $y_i^{train}$ of the set of labels 210-240. A particular probability (p) associated with a particular label $y_i^{train}$ indicates an estimated likelihood that the input data sample $x_i^{train}$ is associated with the particular label $y_i^{train}$. To illustrate, the trained classifier 110 trains the model f (X) using the training data 122-140, and for each input data sample $x_i^{train}$, the probability generator 116 defines the confidence distribution (i.e., the particular probability (p)) over all the labels as $\{p(y_i=1|x_i), p(y_i=2|x_i), p(y_i=3|x_i), \ldots, p(y_i=M|x_i)\}$. The final prediction for each input data sample $x_i^{train}$ is the label $y_i^{train}$ with the highest confidence. For simplification, the final prediction can be expressed as $\{p_1, p_2, p_3, \ldots, p_M\}$.

The trained classifier 110 can use the first relative frequency distribution data 114 to classify different inputs after the training stage (e.g., when the trained classifier 110 is activated or goes "live") using a model f (X) generated during the training stage. For example, the trained classifier 110 can classify different inputs using the first relative frequency distribution 210 of the labels 210-240. To illustrate, the trained classifier 110 can heavily weight that a random input is associated with the first label 210 if the random input is not an obvious variant of another label 220-240. However, because the first relative frequency distribution 210 is based on training inputs 120 used to train the trained classifier 110, if first relative frequency distribution 210 for the training inputs 120 does not accurately reflect the distribution of inputs after the training stage, the trained classifier 110 can inaccurately classify a large number of inputs when the trained classifier 110 goes live.

To circumvent the above, the trained classifier 110 can collect post-training data (e.g., real examples $\{X_i^{test}\}_{i=1}^{N_{test}}$) after the model f (X) goes live and a real inference distribution $P(y_i=L)$ (e.g., a second relative frequency distribution) can be obtained for each label $y_i^{train}$. The confidence for each label can be modified to make the final prediction on the real examples $\{X_i^{test}\}_{i=1}^{N_{test}}$ to follow the real inference distribution $P(y_i=L)$ such that $P(f(X_i)=L)=P(y_i=L)$. Thus, as described with respect to FIGS. 3-4, the set of probabilities $\{p_1, p_2, p_3, \ldots, p_M\}$ can be modified for each label based on the real examples $\{X_i^{test}\}_{i=1}^{N_{test}}$.

Figure 3:
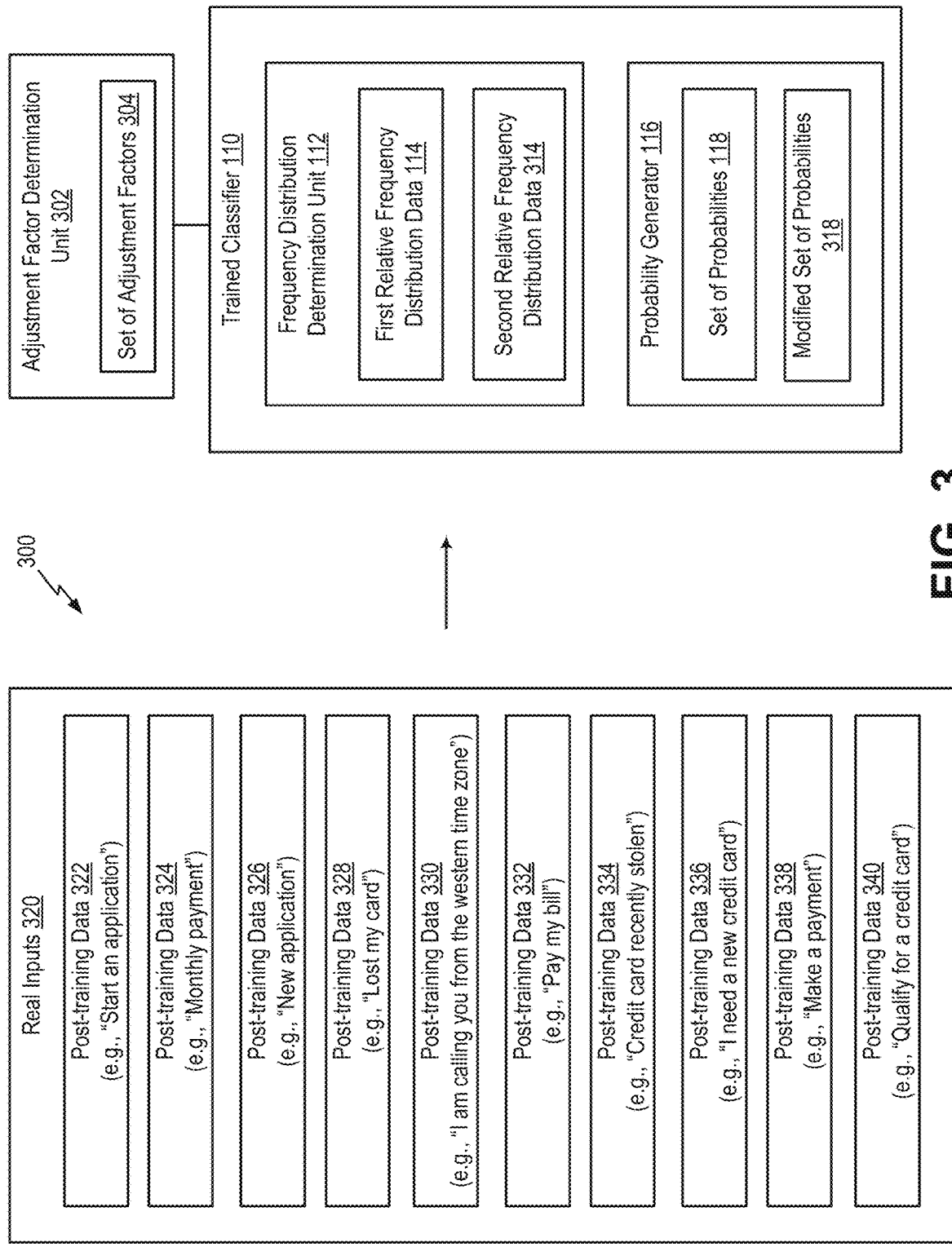
FIG. 3 is a block diagram of a system that is operable to modify an intent label distribution using post-training data.

With reference to FIG. 3, a system 100 that is operable to modify intent label distribution using classify post-training data $\{X_i^{test}\}_{i=1}^{N_{test}}$ is shown. The system 300 includes the trained classifier 110. The trained classifier 110 includes the frequency determination unit 112 that is operable to generate second relative frequency distribution data 314 based on real inputs 120 that are provided to the trained classifier 110 during a live stage. As explained with greater detail with respect to FIG. 4, the second relative frequency distribution data 314 indicates, for each label $y_i^{train}$ the set of labels 210-240, a frequency of occurrence of the label $y_i^{train}$ among post-training data provided to the trained classifier 110.

The real inputs 320 include different post-training data $X_i^{test}$ (e.g., samples, words, phrases, expressions, etc.). For example, the real inputs include post-training data 322, post-training data 324, post-training data 326, post-training data 328, post-training data 330, post-training data 332, post-training data 334, post-training data 336, post-training data 338, and post-training data 340. The post-training data 322 includes the phrase "Start an application", the post-training data 324 includes the phrase "Monthly payment", the post-training data 326 includes the phrase "New application", the post-training data 328 includes the phrase "Lost my card", and the post-training data 330 includes the phrase "I am calling you from the western time zone." The post-training data 332 includes the phrase "Pay my bill", the post-training data 334 includes the phrase "Credit card recently stolen", the post-training data 336 includes the phrase "I need a new credit card", the post-training data 338 includes the phrase "Make a payment," and the post-training data 340 includes the phrase "Qualify for a credit card." In a similar manner as described with respect to FIGS. 1-2, the trained classifier 110 can categorize the post-training data 320-340 into the different categories 210-240.

The frequency distribution determination unit 112 can determine the second relative frequency distribution data 314 that indicates a second relative frequency distribution 450 (e.g., a real distribution) of the post-training data 322-340. The second relative frequency distribution 450 indicates, for each label 210-240, a frequency of occurrence of the label 210-240 among the post-training data 322-340 provided to the trained classifier 110. Because the post-training data 322-340 can be inaccurately classified during the live stage, according to some implementations, the frequency of occurrence of each label among the post-training data 322-340 can be user-determined (as opposed to being determined by the frequency distribution determination unit 112).

Figure 4:
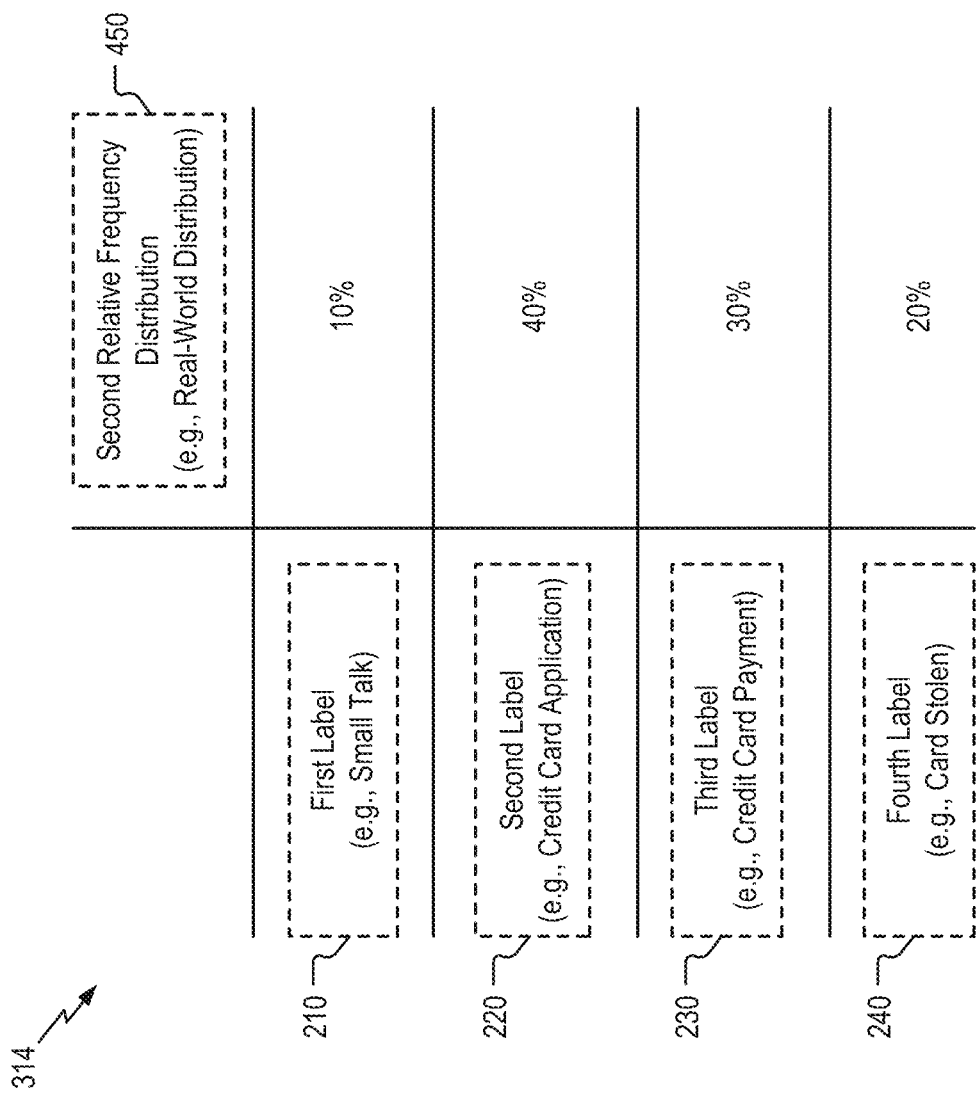
FIG. 4 illustrates an example of the modified intent label distribution according to the techniques and system of FIG. 3.

Referring to the second relative frequency distribution data 314 in FIG. 4, the second relative frequency distribution 450 of the first label 210 is ten percent (10%). That is, ten percent of the post-training data 322-340 is associated with the first label 210 (e.g., "small talk"). To illustrate, the post-training data 330 is associated with the first label 210. The second relative frequency distribution 450 of the second label 220 is forty percent (40%). That is, forty percent of the post-training data 322-340 is associated with the second label 220 (e.g., "credit card application"). To illustrate, the post-training data 322, the post-training data 326, the post-training data 336, and the post-training data 340 are associated with the second label 220. The second relative frequency distribution 450 of the third label 230 is thirty percent (30%). That is, thirty percent of the post-training data 322-340 is associated with the third label 230 (e.g., "credit card payment"). To illustrate, the post-training data 324, the post-training data 332, and the post-training data 338 are associated with the third label 230. The second relative frequency distribution 450 of the fourth label 240 is twenty percent (20%). That is, twenty percent of the post-training data 322-340 are associated with the fourth label 240 (e.g., "card stolen"). To illustrate, the post-training data 328 and the post-training data 334 are associated with the fourth label 240.

The system 300 also includes an adjustment factor determination unit 302 that is coupled to the trained classifier 110. The adjustment factor determination unit 302 is configured to determine a set of adjustment factors 304 that are used to modify the set of probabilities 118. The set of adjustment factors 304 are an extra set of parameters $\{\alpha_i\}_{i=1}^{M}$ (e.g., "learnable parameters") for rescaling the final prediction confidence $\{p_1, p_2, p_3, \ldots, p_M\}$ (e.g., the set of probabilities 118) by a linear projection to generate a modified set of probabilities 318 expressed as $\{\alpha_1 p_1, \alpha_2 p_2, \alpha_3 p_3, \alpha_M p_M\}$. Thus, each probability of the modified set of probabilities 318 is a linear projection of a corresponding probability of the set of probabilities 118.

The trained classifier 110 is configured to determine (e.g., compute) a new prediction $(y'_i = \text{argmax}_j(\alpha_j p_j))$ based on each occurrence of posting training data $(X_i^{test})$ 322-340. The highest adjusted probability $\alpha_j p_j$ is selected as the label. Based on the determined new prediction $(y'_i = \text{argmax}_j(\alpha_j p_j))$, the trained classifier 110 can determine the second relative frequency distribution 450 (e.g., the real-world distribution $P(y_i = L))$ using the equation $P'(y'_i = L) = \#(y'_i = L)/|X_i^{test}|$. The second relative frequency distribution 450 can be updated based on each occurrence of post-training data $(X_i^{test})$ 322-340, and the new prediction $(y'_i = \text{argmax}_j(\alpha_j p_j))$ is generated based on each occurrence of post-training data $(X_i^{test})$ 322-340 for continuous learning. The loss between the new prediction $(y'_i = \text{argmax}_j(\alpha_j p_j))$ and the . . . can be defined as a divergence between the first relative frequency distribution $(P'(y'_i = L))$ 250 and the second relative frequency distribution $P(y_i = L))$ 450. According to one implementation, the divergence includes a Kullback-Leibler divergence.

The techniques described with respect to FIGS. 1-4 enable an intent classification model to be modified using linear projection based on the real inputs 320. For example, the second relative frequency distribution 450 can be used to modify the intent classification model, bypassing the time consuming process of re-training model, based on a distribution of labels that are associated with the post-training data 322-340. As a result, chat-bots can be continuously updated based on real-world inputs to more accurately classify input samples (e.g., phrases, words, etc.) with the appropriate label 210-240. Thus, the techniques described with respect to FIGS. 1-4 enables fast adjustment of the intent classification model to a target label distribution (e.g., the second relative frequency distribution 450) without requiring extra labeling processes or re-training.

With reference to FIG. 5, an intent classification chart 500 that displays results of intent classifications based on the techniques described herein is shown. The intent classification chart 500 depicts probabilities of different inputs (e.g., testing text) being classified to a particular label.

To illustrate, first testing text 502 includes the phrase "I need a credit card application." The intent classification chart 500 depicts that there is an eighty-five (85) percent probability that the first testing text 502 is associated with the second label 220 (e.g., the credit card application label). Second testing text 504 includes the phrase "How much is my monthly payment." The intent classification chart 500 depicts that there is an eighty-five (85) percent probability that the second testing text 504 is associated with the third label 230 (e.g., the credit card payment label). Third testing text 506 includes the phrase "Start a credit application." The intent classification chart 500 depicts that there is a seventy-eight (78) percent probability that the third testing text 506 is associated with the second label 220 (e.g., the credit card application label).

Fourth testing text 508 includes the phrase "Misplaced my credit card." The intent classification chart 500 depicts that there is a seventy-five (75) percent probability that the fourth testing text 508 is associated with the fourth label 240 (e.g., the card stolen label). Fifth testing text 510 includes the phrase "I want to pay my bill." The intent classification chart 500 depicts that there is an eighty (85) percent probability that the fifth testing text 510 is associated with the third label 230 (e.g., the credit card payment label). Sixth testing text 512 includes the phrase "Somebody stole my card." The intent classification chart 500 depicts that there is a seventy-five (75) percent probability that the sixth testing text 512 is associated with the fourth label 240 (e.g., the card stolen label).

Seventh testing text 514 includes the phrase "Partial payment." The intent classification chart 500 depicts that there is a seventy-nine (79) percent probability that the seventh testing text 514 is associated with the third label 230 (e.g., the credit card payment label). Eighth testing text 516 includes the phrase "Do I qualify for a new card." The intent classification chart 500 depicts that there is a sixty-five (65) percent probability that the eighth testing text 516 is associated with the second label 220 (e.g., the credit card application label). Ninth testing text 518 includes the phrase "Start the application process." The intent classification chart 500 depicts that there is a seventy-two (72) percent probability that the ninth testing text 518 is associated with the second label 220 (e.g., the credit card application label). Tenth testing text 520 includes the phrase "Pay my bill." The intent classification chart 500 depicts that there is a ninety (90) percent probability that the tenth testing text 520 is associated with the third label 230 (e.g., the credit card payment label).

Thus, based on the techniques described with respect to FIGS. 1-4, there is a high likelihood (or probability) that the testing text 502-520 will be classified to the correct labels 210-240.

Figure 6:
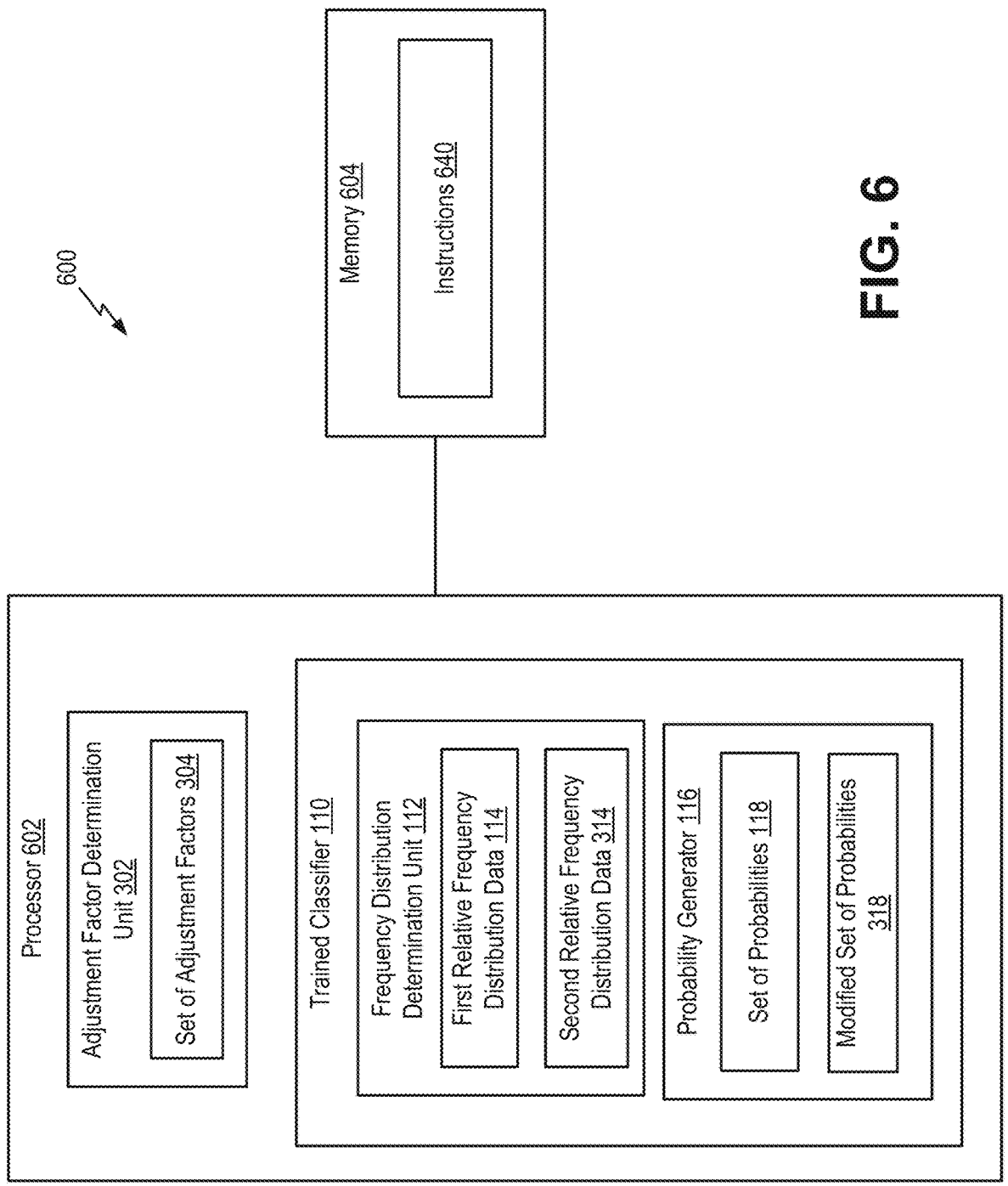
FIG. 6 is a block diagram of a system that is operable to modify intent label distribution using post-training data.

With reference to FIG. 6, a system 600 that is operable to modify intent label distribution using post-training data $\{X_i^{test}\}_{i=1}^{N_{test}}$ is shown. The system 600 includes a processor 602 and a memory 604 coupled to the processor 602. The memory 604 includes instructions 640 that are executable by the processor 604 to perform the operations described with respect to FIGS. 1-5. The processor 602 includes the adjustment factor determination unit 302 and the trained classifier 110.

FIG. 7 is a flowchart of a method 700 for intent classification. In an illustrative example, the method 700 is performed by the system 100 of FIG. 1, the system 300 of FIG. 3, the system 600 of FIG. 6, or a combination thereof.

The method 700 includes determining, by a trained classifier based on an input data sample, a set of probabilities, at 702. Each probability of the set of probabilities is associated with a respective label of a set of labels. A particular probability is associated with a particular label indicating an estimated likelihood that the input data sample is associated with the particular label.

The method 700 also includes modifying the set of probabilities based on a set of adjustment factors to generate a modified set of probabilities, at 704. The set of adjustment factors is based on a first relative frequency distribution and a second relative frequency distribution. The first relative frequency distribution indicates for each label of the set of labels, a frequency of occurrence of the label among training data used to train the trained classifier. The second relative frequency distribution indicates for each label of the set of labels, a frequency of occurrence of the label among post-training data provided to the trained classifier.

According to one implementation, the method 700 includes determining the set of adjustment factors 304 using a gradient descent technique to solve for $\{\alpha_i\}_{i=1}^{M}$.

According to one implementation of the method 700, each probability of the modified set of probabilities is a linear projection of a corresponding probability of the set of probabilities. For example, the set of adjustment factors 304 are an extra set of parameters $\{\alpha_i\}_{i=1}^{M}$ (e.g., "learnable parameters") for rescaling the final prediction confidence $\{p_1, p_2, p_3, \ldots, p_M\}$ (e.g., the set of probabilities 118) by a linear projection to generate a modified set of probabilities 318 expressed as $\{\alpha_1 p_1, \alpha_2 p_2, \alpha_3 p_3, \ldots, \alpha_M p_M\}$. Thus, each probability of the modified set of probabilities 318 is a linear projection of a corresponding probability of the set of probabilities 118.

According to one implementation, the method 700 includes determining, for each occurrence of post-training data 322-340, a new classification prediction using the formula $y'_i = \text{argmax}_j(\alpha_j p_j)$. The method 700 can also include determining a label distribution based on the new classification prediction using the formula $P'(y'_i = L) = \#(y'_i = L)/|X_i^{test}|$. The method 700 can also include classifying an input based on the modified set of probabilities 318.

According to one implementation of the method 700, the frequency of occurrence of each label among the post-training data is user-determined. For example, because the post-training data 322-340 can be inaccurately classified during the live stage, according to some implementations, the frequency of occurrence of each label among the post-training data 322-340 can be user-determined (as opposed to being determined by the frequency distribution determination unit 112).

According to one implementation, the method 700 includes updating the second relative frequency distribution based on each occurrence of post-training data. For example, the second relative frequency distribution 450 can be updated based on each occurrence of post-training data $(X_i^{test})$ 322-340, and a new prediction $(y'_i = \text{argmax}_j(\alpha_j p_j))$ is generated based on each occurrence of post-training data $(X_i^{test})$ 322-340 for continuous learning.

According to one implementation, the method 700 includes determining a divergence between the first relative frequency distribution and the second relative frequency distribution. For example, the adjustment factor determination unit 302 determines the divergence between the first relative frequency distribution 250 and the second relative frequency distribution 450. According to one implementation, the divergence includes a Kullback-Leibler divergence. According to other implementations, the divergence can include a Jensen Shannon divergence or another loss function that determines the difference of two probabilities. A loss between the classification prediction based on the modified set of probabilities 318 and the classification prediction based on the set of probabilities 118 is based on the divergence.

The method 700 of FIG. 7 enables an intent classification model to be modified using linear projection based on the real inputs 320. For example, the second relative frequency distribution 450 can be used to modify the intent classification model, bypassing the time consuming process of re-training model, based on a distribution of labels that are associated with the post-training data 322-340. As a result, chat-bots can be continuously updated based on real-world inputs to more accurately classify input samples (e.g., phrases, words, etc.) with the appropriate label 210-240.

Figure 8:
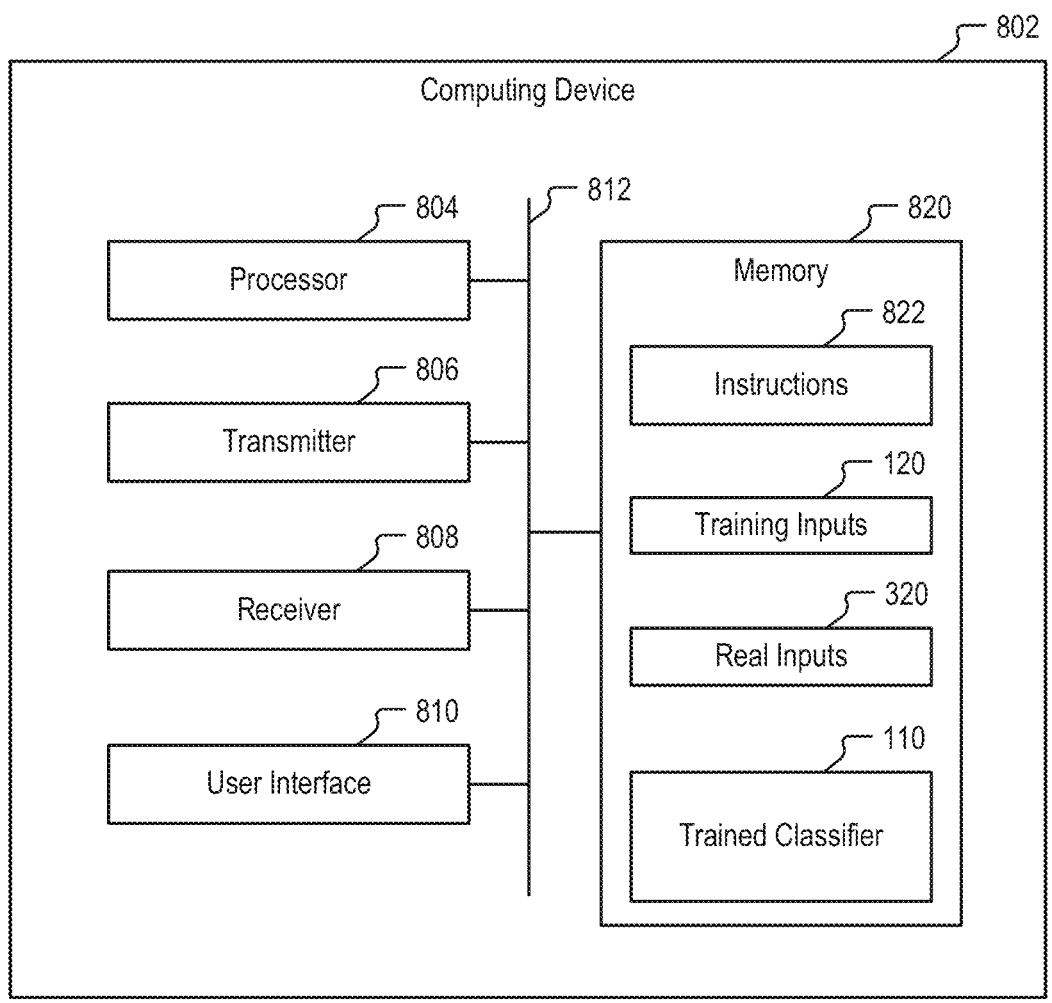
FIG. 8 is a block diagram of a computing device configured to train a classifier that is operable to modify an intent label distribution using post-training data.

FIG. 8 illustrates a diagram of a computing device 802 configured to train the trained classifier 110. The computing device 802 may include or correspond to a desktop computer, a laptop computer, a tablet computer, a server, a mainframe, or any other type of computing device.

The computing device 802 includes a processor 804, a transmitter 806, a receiver 808, a user interface 810, and a memory 820. The processor 804, the transmitter 806, the receiver 808, the user interface 810, and the memory 820 may be coupled together via a bus 812 (or other connection). The example illustrated in FIG. 8 is not intended to be limiting, and in other implementations, one or more of the processor 804, the transmitter 806, the receiver 808, the user interface 810, the bus 812, and the memory 820 are optional, or more components may be included in the computing device 802.

The transmitter 806 is configured to enable the computing device 802 to send data to one or more other devices via direct connection or via one or more networks, and the receiver 808 is configured to enable the computing device 802 to receive data from one or more other devices via direct connection or via one or more networks. The one or more networks may include Institute of Electrical and Electronics Engineers (IEEE) 802 wireless networks, Bluetooth networks, telephone networks, optical or radio frequency networks, or other wired or wireless networks. In some implementations, the transmitter 806 and the receiver 808 may be replaced with a transceiver that enables sending and receipt of data from one or more other devices.

The user interface 810 is configured to facilitate user interaction. For example, the user interface 810 is adapted to receive input from a user, to provide output to a user, or a combination thereof. In some implementations, the user interface 810 conforms to one or more standard interface protocols, including serial interfaces (e.g., universal serial bus (USB) interfaces or IEEE interface standards), parallel interfaces, display adapters, audio adaptors, or custom interfaces. In some implementations, the user interface 810 is configured to communicate with one or more input/output devices, such as some combination of buttons, keyboards, pointing devices, displays, speakers, microphones, touch screens, and other devices.

The memory 820 includes volatile memory devices (e.g., random access memory (RAM) devices), nonvolatile memory devices (e.g., read-only memory (ROM) devices, programmable read-only memory, and flash memory), or both. The memory 820 is configured to store instructions 822. The processor 804 is configured to execute the instructions 822 to perform the operations described herein. To illustrate, the processor 804 may execute the instructions 822 to obtain the training inputs 120 during the training stage of the trained classifier 110 and to obtain the real inputs 320 during the live stage of the trained classifier 110. The processor 804 may also execute the instructions to train the trained classifier 110 as described with respect to FIGS. 1-7.

Figure 9:
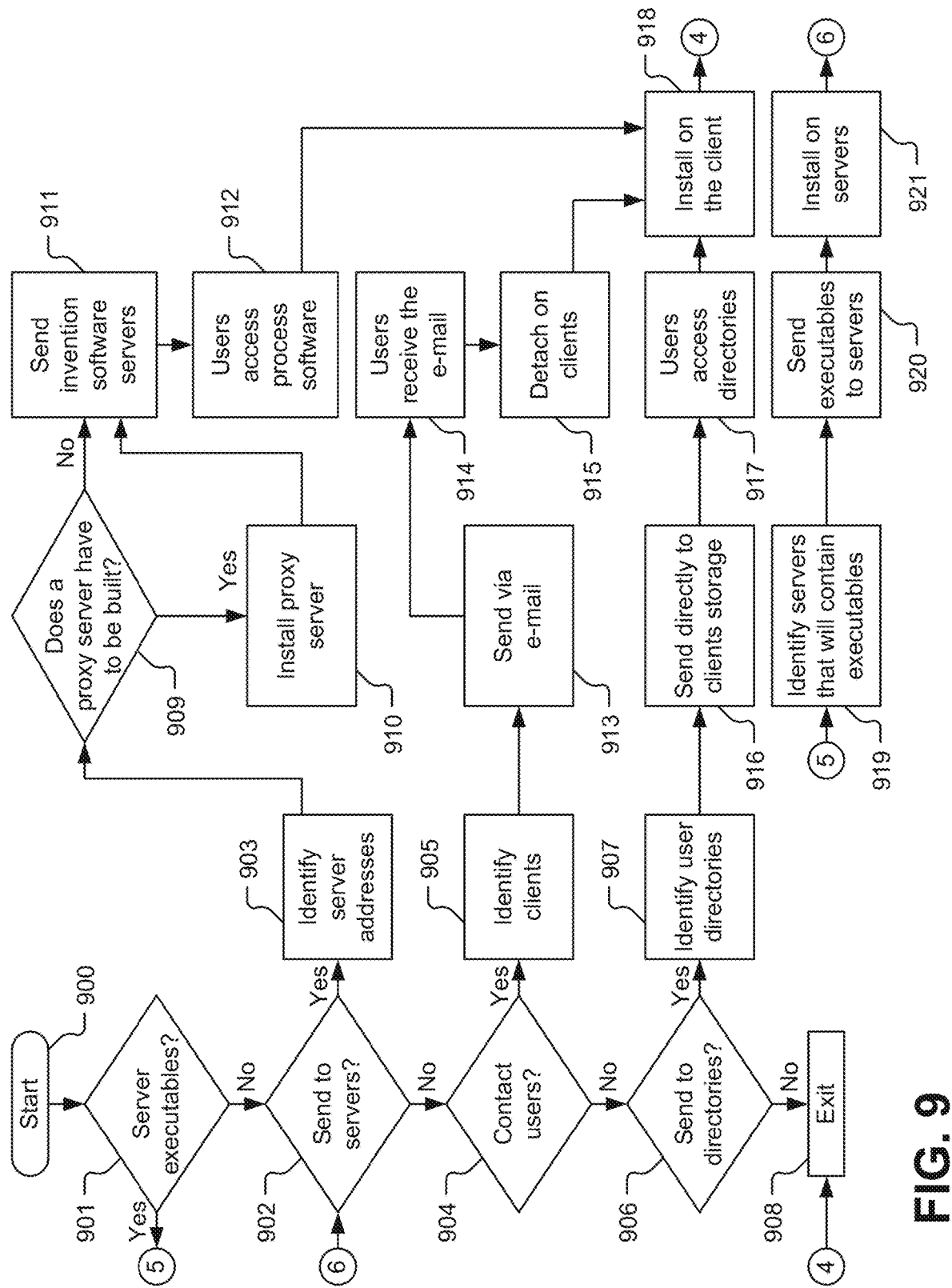
FIG. 9 is a flowchart that illustrates an example of a method of deploying a classifier that is operable to modify an intent label distribution using post-training data.

FIG. 9 is a flowchart that illustrates an example of a method of deploying the trained classifier 110 according to an implementation of the present invention. While it is understood that process software, such as the trained classifier 110, may be deployed by manually loading it directly in the client, server, and proxy computers via loading a storage medium such as a CD, DVD, etc., the process software may also be automatically or semi-automatically deployed into a computer system by sending the process software to a central server or a group of central servers. The process software is then downloaded into the client computers that will execute the process software. Alternatively, the process software is sent directly to the client system via e-mail. The process software is then either detached to a directory or loaded into a directory by executing a set of program instructions that detaches the process software into a directory. Another alternative is to send the process software directly to a directory on the client computer hard drive. When there are proxy servers, the process will select the proxy server code, determine on which computers to place the proxy servers' code, transmit the proxy server code, and then install the proxy server code on the proxy computer. The process software will be transmitted to the proxy server, and then it will be stored on the proxy server.

Step 900 begins the deployment of the process software. An initial step is to determine if there are any programs that will reside on a server or servers when the process software is executed (901). If this is the case, then the servers that will contain the executables are identified (919). The process software for the server or servers is transferred directly to the servers' storage via FTP or some other protocol or by copying though the use of a shared file system (920). The process software is then installed on the servers (921).

Next, a determination is made on whether the process software is to be deployed by having users access the process software on a server or servers (902). If the users are to access the process software on servers, then the server addresses that will store the process software are identified (903).

A determination is made if a proxy server is to be built (909) to store the process software. A proxy server is a server that sits between a client application, such as a Web browser, and a real server. It intercepts all requests to the real server to see if it can fulfill the requests itself. If not, it forwards the request to the real server. The two primary benefits of a proxy server are to improve performance and to filter requests. If a proxy server is required, then the proxy server is installed (910). The process software is sent to the (one or more) servers either via a protocol such as FTP, or it is copied directly from the source files to the server files via file sharing (911). Another embodiment involves sending a transaction to the (one or more) servers that contained the process software, and have the server process the transaction and then receive and copy the process software to the server's file system. Once the process software is stored at the servers, the users via their client computers then access the process software on the servers and copy to their client computers file systems (912). Another embodiment is to have the servers automatically copy the process software to each client and then run the installation program for the process software at each client computer. The user executes the program that installs the process software on his client computer (918) and then exits the process (908).

In step 904 a determination is made whether the process software is to be deployed by sending the process software to users via e-mail. The set of users where the process software will be deployed are identified together with the addresses of the user client computers (905). The process software is sent via e-mail to each of the users' client computers (913). The users then receive the e-mail (914) and then detach the process software from the e-mail to a directory on their client computers (915). The user executes the program that installs the process software on his client computer (918) and then exits the process (908).

Lastly, a determination is made on whether the process software will be sent directly to user directories on their client computers (906). If so, the user directories are identified (907). The process software is transferred directly to the user's client computer directory (916). This can be done in several ways such as, but not limited to, sharing the file system directories and then copying from the sender's file system to the recipient user's file system or, alternatively, using a transfer protocol such as File Transfer Protocol (FTP). The users access the directories on their client file systems in preparation for installing the process software (917). The user executes the program that installs the process software on his client computer (918) and then exits the process (908).

Figure 10:
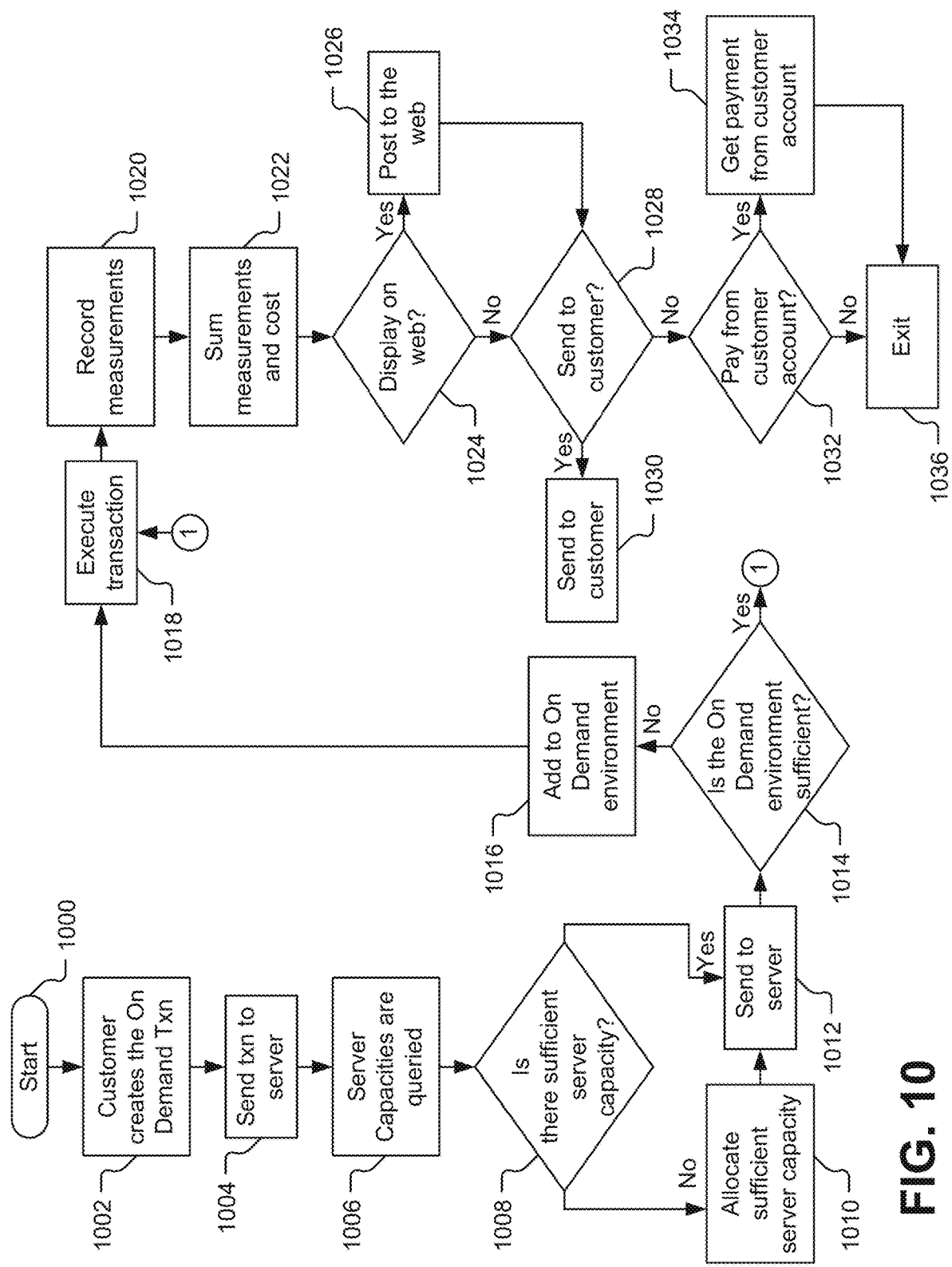
FIG. 10 is a flowchart that illustrates an example of a method of using a classifier that is operable to modify an intent label distribution using post-training data.

FIG. 10 is a flowchart that illustrates an example of a method of using trained classifier 110 in an on demand context. In FIG. 7, the process software, such as the trained classifier 110, may also be shared, simultaneously serving multiple customers in a flexible, automated fashion. It is standardized, requiring little customization, and it is scalable, providing capacity on demand in a pay-as-you-go model.

The process software can be stored on a shared file system accessible from one or more servers. The process software is executed via transactions that contain data and server processing requests that use CPU units on the accessed server. CPU units are units of time, such as minutes, seconds, and hours, on the central processor of the server. Additionally, the accessed server may make requests of other servers that require CPU units. CPU units are an example that represents but one measurement of use. Other measurements of use include, but are not limited to, network bandwidth, memory usage, storage usage, packet transfers, complete transactions, etc.

When multiple customers use the same process software application, their transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload. Likewise, when other measurements of use, such as network bandwidth, memory usage, storage usage, etc., approach a capacity so as to affect performance, additional network bandwidth, memory usage, storage, etc. are added to share the workload.

The measurements of use employed for each service and customer are sent to a collecting server that sums the measurements of use for each customer for each service that was processed anywhere in the network of servers that provide the shared execution of the process software. The summed measurements of use units are periodically multiplied by unit costs, and the resulting total process software application service costs are alternatively sent to the customer and/or indicated on a web site accessed by the customer, who may then remit payment to the service provider.

In another embodiment, the service provider requests payment directly from a customer account at a banking or financial institution.

In another embodiment, if the service provider is also a customer of the customer that uses the process software application, the payment owed to the service provider is reconciled to the payment owed by the service provider to minimize the transfer of payments.

Step 1000 begins the On Demand process. A transaction is created that contains the unique customer identification, the requested service type, and any service parameters that further specify the type of service (1002). The transaction is then sent to the main server (1004). In an On Demand environment, the main server can initially be the only server, and then as capacity is consumed other servers are added to the On Demand environment.

The server central processing unit (CPU) capacities in the On Demand environment are queried (1006). The CPU requirement of the transaction is estimated, and then the server's available CPU capacity in the On Demand environment is compared to the transaction CPU requirement to see if there is sufficient CPU available capacity in any server to process the transaction (1008). If there is not sufficient server CPU available capacity, then additional server CPU capacity is allocated to process the transaction (1010). If there was already sufficient available CPU capacity, then the transaction is sent to a selected server (1012).

Before executing the transaction, a check is made of the remaining On Demand environment to determine if the environment has sufficient available capacity for processing the transaction. This environment capacity consists of such things as, but not limited to, network bandwidth, processor memory, storage etc. (1014). If there is not sufficient available capacity, then capacity will be added to the On Demand environment (1016). Next the required software to process the transaction is accessed, loaded into memory, and then the transaction is executed (1018).

The usage measurements are recorded (1020). The usage measurements consist of the portions of those functions in the On Demand environment that are used to process the transaction. The usage of such functions as, but not limited to, network bandwidth, processor memory, storage and CPU cycles are what is recorded. The usage measurements are summed, multiplied by unit costs, and then recorded as a charge to the requesting customer (1022).

If the customer has requested that the On Demand costs be posted to a web site (1024), then they are posted thereto (1026). If the customer has requested that the On Demand costs be sent via e-mail to a customer address (1028), then they are sent (1030). If the customer has requested that the On Demand costs be paid directly from a customer account (1032), then payment is received directly from the customer account (1034). On Demand process proceeds to 1036 and exits.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 11:
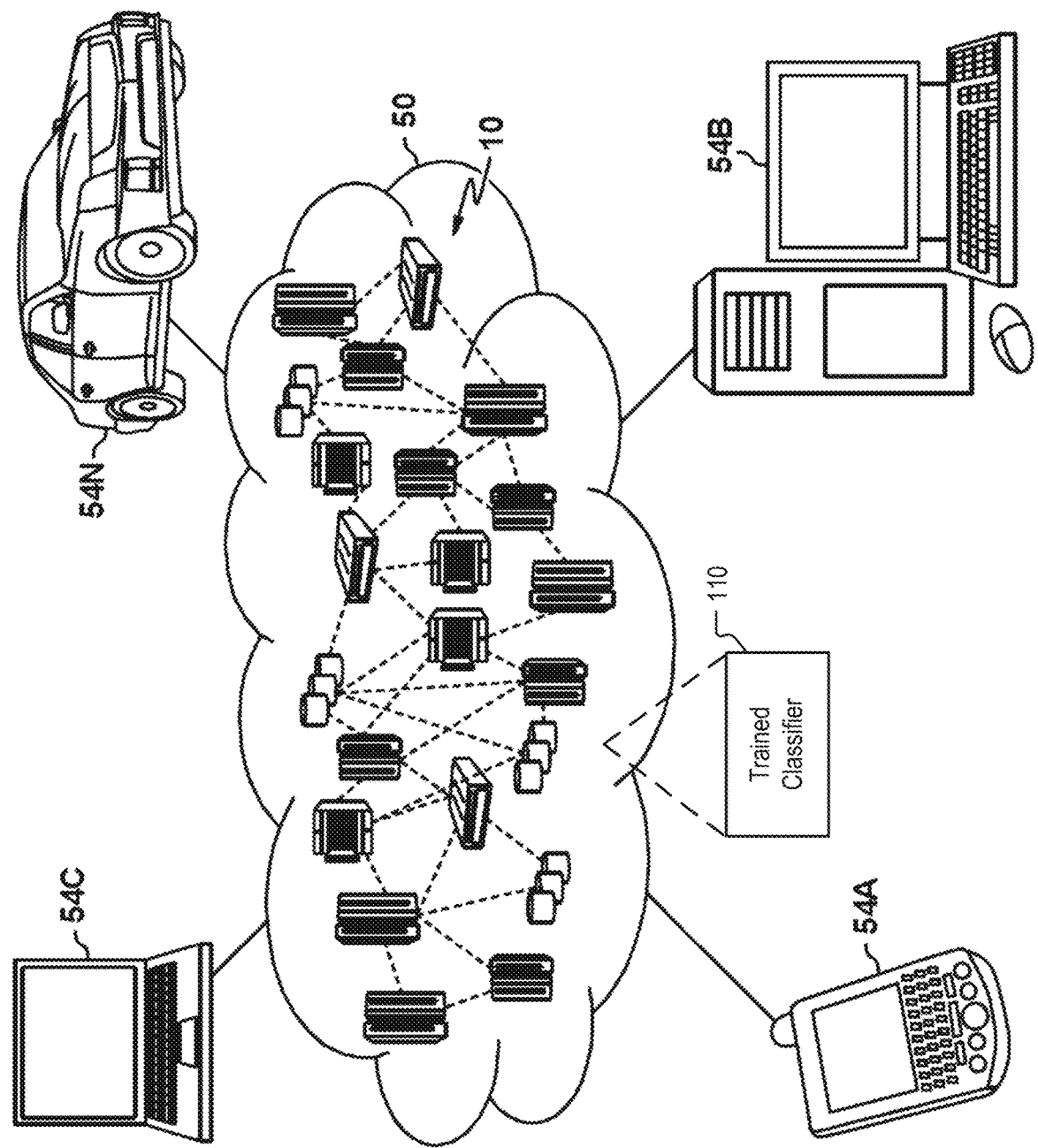
FIG. 11 depicts a cloud computing environment that includes a classifier that is operable to modify an intent label distribution using post-training data.
Figure 12:
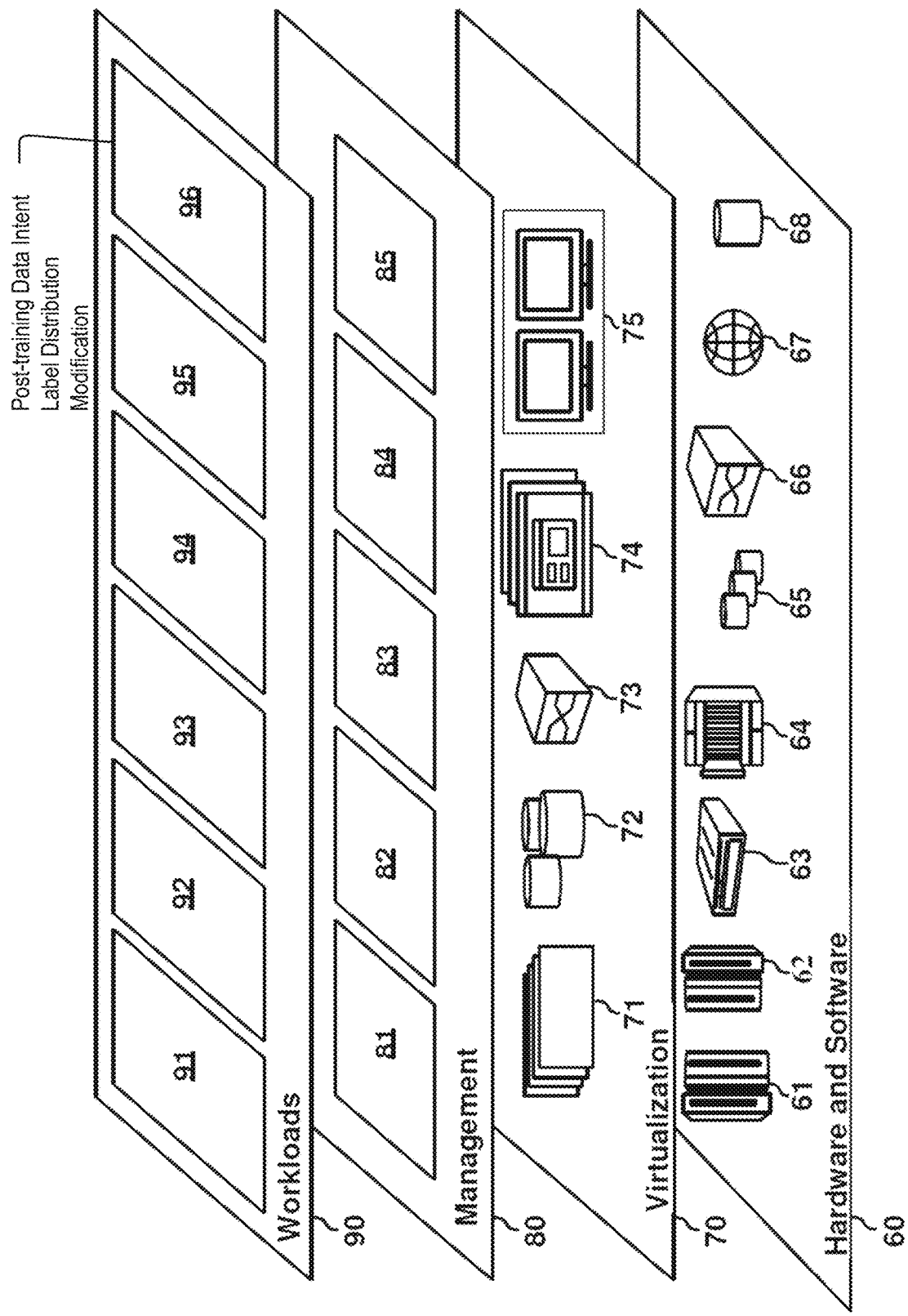
FIG. 12 depicts abstraction model layers provided by a cloud environment that includes a classifier that is operable to modify an intent label distribution using post-training data.

Referring to FIG. 11, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 11 are intended to be illustrative only and that computing nodes 10 and cloud computing environment 50 can communicate with any type of computerized device over any type of network and/or network addressable connection (e.g., using a web browser). In a particular implementation, one or more of the nodes 10 include the trained classifier 110 of FIG. 1.

Referring to FIG. 11, a set of functional abstraction layers provided by cloud computing environment 50 (FIG. 10) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and post-training data intent label distribution modification 96. For example, the post-training data intent label distribution modification 96 may use or have access to the trained classifier 110.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method of modifying an intent classification model using a target distribution of labels without retraining the intent classification model, the computer-implemented method comprising:
    inputting into a trained classifier an input data sample comprising training data;
    categorizing, by the trained classifier, the training data into intent labels that form a set of labels, generating a first relative frequency distribution of the intent labels indicating a frequency of occurrence of each of the intent labels among the training data;
    outputting, from the trained classifier, a confidence distribution comprising a set of probabilities based on the input data sample, the first relative frequency distribution of the intent labels and the intent classification model trained using the training data, wherein each probability of the set of probabilities is associated with a respective label of the intent labels, and a particular probability associated with a particular label indicating an estimated likelihood that the input data sample is associated with the particular label;

inputting, into the trained classifier, post-training data;

rescaling, by the trained classifier, the confidence distribution into a final prediction confidence of the set of probabilities for the post-training data by applying a set of adjustment factors using a linear projection to the set of probabilities, generating a modified set of probabilities, wherein the set of adjustment factors are based on the first relative frequency distribution and a second relative frequency distribution, the second relative frequency distribution indicating for each intent label of the set of labels, a frequency of occurrence of the intent labels among the post-training data provided to the trained classifier;

enabling adjustment of the intent classification model to the second relative frequency distribution operating as the target distribution of labels; and classifying input data samples using the trained classifier applying the modified set of probabilities to input data samples.

2. The computer-implemented method of claim 1, further comprising determining a divergence between the first relative frequency distribution and the second relative frequency distribution, wherein a loss between a classification prediction based on the modified set of probabilities and a classification prediction based of the set of probabilities is based on the divergence.

3. The computer-implemented method of claim 2, wherein the divergence comprises a Kullback-Leibler divergence.

4. The computer-implemented method of claim 1, further comprising determining, for each occurrence of post-training data, a new classification prediction using the formula $y'_i = \text{argmax}_j(\alpha_j p_j)$, wherein $y'_i$ is the new classification prediction, and $\text{argmax}_j(a_j p_j)$ is a highest adjusted probability within the modified set of probabilities.

5. The computer-implemented method of claim 4, further comprising determining a label distribution based on the new classification prediction using the formula $P'(y'_i = L) = \#(y'_i = L)/|X_i^{test}|$, wherein the modified set of probabilities (P') for the new classification prediction ($y'_i$) is modified for each of the intent labels (L) to make a final prediction for each input of post-training data ($X_i^{test}$).

6. The computer-implemented method of claim 1, wherein each probability of the modified set of probabilities is a linear projection of a corresponding probability of the set of probabilities.

7. The computer-implemented method of claim 1, wherein the frequency of occurrence of each label among the post-training data is user-determined.

8. The computer-implemented method of claim 1, further comprising updating the second relative frequency distribution based on each occurrence of post-training data.

9. The computer-implemented method of claim 1, further comprising classifying an input based on the modified set of probabilities.

10. An system for modifying an intent classification model using a target distribution of labels without retraining the intent classification model comprising:

a processor; and a memory coupled to the processor and storing instructions that, when executed by the processor, cause the processor to perform operations comprising:

inputting into a trained classifier an input data sample comprising training data;

categorizing, by the trained classifier, the training data into intent labels that form a set of labels generating a first relative frequency distribution of the intent labels indicating a frequency of occurrence of each of the intent labels among the training data;

outputting, from the trained classifier, a confidence distribution comprising a set of probabilities based on the input data sample, the first relative frequency distribution of the intent labels and the intent classification model trained using the training data, wherein each probability of the set of probabilities is associated with a respective label of the intent labels, and a particular probability associated with a particular label indicating an estimated likelihood that the input data sample is associated with the particular label;

inputting, into the trained classifier, post-training data;

rescaling, by the trained classifier, the confidence distribution into a final prediction confidence of the set of probabilities for the post-training data by applying a set of adjustment factors using a linear projection to the set of probabilities, generating a modified set of probabilities, wherein the set of adjustment factors are based on the first relative frequency distribution and a second relative frequency distribution, the second relative frequency distribution indicating for each intent label of the set of labels, a frequency of occurrence of the intent labels among the post-training data provided to the trained classifier;

enabling adjustment of the intent classification model to the second relative frequency distribution operating as the target distribution of labels; and classifying input data samples using the trained classifier applying the modified set of probabilities to input data samples for classification.

11. The apparatus of claim 10, wherein the operations further comprise determining a divergence between the first relative frequency distribution and the second relative frequency distribution, wherein a loss between a classification prediction based on the modified set of probabilities and a classification prediction based of the set of probabilities is based on the divergence.

12. The apparatus of claim 11, wherein the divergence comprises a Kullback-Leibler divergence.

13. The apparatus of claim 10, wherein the operations further comprise determining, for each occurrence of post-training data, a new classification prediction using the formula $y'_i = \text{argmax}_j(\alpha_j p_j)$, wherein $y'_i$ is the new classification prediction, and $\text{argmax}_j(a_j p_j)$ is a highest adjusted probability within the modified set of probabilities.

14. The apparatus of claim 13, wherein the operations further comprise determining a label distribution based on the new classification prediction using the formula $P'(y'_i = L) = \#(y'_i = L)/|X_i^{test}|$, wherein the modified set of probabilities (P') for the new classification prediction ($y'_i$) is modified for each of the intent labels (L) to make a final prediction for each input of post-training data ($X_i^{test}$).

15. The apparatus of claim 10, wherein each probability of the modified set of probabilities is a linear projection of a corresponding probability of the set of probabilities.

16. A computer program product for modifying an intent classification model using a target distribution of labels without retraining the intent classification model, the computer program product comprising:
- a computer readable storage medium having program instructions embodied therewith, the program instructions executable by a processor to cause the processor to perform operations comprising:
    - inputting into a trained classifier an input data sample comprising training data;
    - categorizing, by the trained classifier, the training data into intent labels that form a set of labels generating a first relative frequency distribution of the intent labels indicating a frequency of occurrence of each of the intent labels among the training data;
    - outputting, from the trained classifier, a confidence distribution comprising a set of probabilities based on the input data sample, the first relative frequency distribution of the intent labels and the intent classification model trained using the training data, wherein each probability of the set of probabilities is associated with a respective label of the intent labels, and a particular probability associated with a particular label indicating an estimated likelihood that the input data sample is associated with the particular label;
    - inputting, into the trained classifier, post-training data;
    - resealing, by the trained classifier, the confidence distribution into a final prediction confidence of the set of probabilities for the post-training data by applying a set of adjustment factors using a linear projection to the set of probabilities, generating a modified set of probabilities, wherein the set of adjustment factors are based on the first relative frequency distribution and a second relative frequency distribution, the second relative frequency distribution indicating for each intent label of the set of labels, a frequency of occurrence of the intent labels among the post-training data provided to the trained classifier;
    - enabling adjustment of the intent classification model to the second relative frequency distribution operating as the target distribution of labels; and
    - classifying input data samples using the trained classifier applying the modified set of probabilities to input data samples for classification.

17. The computer program product of claim 16, wherein the operations further comprise determining, for each occurrence of post-training data, a new classification prediction using the formula $y'_i = \mathrm{argmax}_j(a_j p_j)$, wherein $y'_i$ is the new classification prediction, and $\mathrm{argmax}_j(a_j p_j)$ is a highest adjusted probability within the modified set of probabilities.

18. The computer program product of claim 17, wherein the operations further comprise determining a label distribution based on the new classification prediction using the formula $P'(y'_i = L) = \#(y'_i = L)/|X_i^{test}|$, wherein the modified set of probabilities (P') for the new classification prediction ($y'_i$) is modified for each of the intent labels (L) to make a final prediction for each input of the post-training data ($X_i^{test}$).

19. The computer program product of claim 16, further comprising determining the set of adjustment factors using a gradient descent technique.

20. The computer program product of claim 16, wherein each probability of the modified set of probabilities is a linear projection of a corresponding probability of the set of probabilities.

* * * * *